United States Patent [19]
Pierse

[11] 3,877,779
[45] Apr. 15, 1975

[54] DUAL MAGNIFICATION MICROSCOPE

[76] Inventor: Dermot John Pierse, 143 Harley St., London, England

[22] Filed: June 18, 1973

[21] Appl. No.: 371,244

Related U.S. Application Data

[63] Continuation of Ser. No. 182,687, Sept. 22, 1971, abandoned.

[52] U.S. Cl. ............... 350/33; 350/20; 350/35; 350/37
[51] Int. Cl. ........................................ G02b 21/20
[58] Field of Search ....................... 350/33–36, 350/20, 37

[56] References Cited
UNITED STATES PATENTS

| | | | |
|---|---|---|---|
| 880,028 | 2/1908 | Konig | 350/33 X |
| 1,012,715 | 12/1911 | Saegmuller | 350/33 |
| 1,864,895 | 6/1932 | Egy | 350/20 X |
| 2,466,455 | 4/1949 | Luboshez | 350/33 X |
| 2,472,600 | 6/1949 | Luboshez | 350/33 |
| 2,527,719 | 10/1950 | Greenstein et al. | 350/20 |
| 2,578,013 | 12/1951 | Monk | 350/37 X |
| 2,619,874 | 12/1952 | Lane | 350/20 |
| 2,705,490 | 4/1955 | Littmann | 350/20 |
| 3,229,570 | 1/1966 | Erban | 350/20 X |
| 3,637,283 | 1/1972 | Tasaki et al. | 350/96 B X |

FOREIGN PATENTS OR APPLICATIONS

| | | | |
|---|---|---|---|
| 960,383 | 6/1964 | United Kingdom | 350/33 |
| 984,410 | 2/1965 | United Kingdom | 350/33 |

Primary Examiner—David H. Rubin
Attorney, Agent, or Firm—Karl F. Ross; Herbert Dubno

[57] ABSTRACT

A bifocal microscope with dual magnification, of monocular or binocular type, has two closely juxtaposed eyepieces alternately viewable by the same eye, the light passing through a common objective to the eyepieces by way of separate optical paths with different image magnification. The two paths are of different geometrical length; in the case of identical eyepieces, a supplemental lens may be included in one of them to compensate for the difference in path length. The light beam traversing the objective may be divided into two portions, respectively propagating along these paths, by a beam splitter establishing between the two beam portions an intensity ratio substantially equaling the ratio of the squares of the respective magnifications.

13 Claims, 4 Drawing Figures

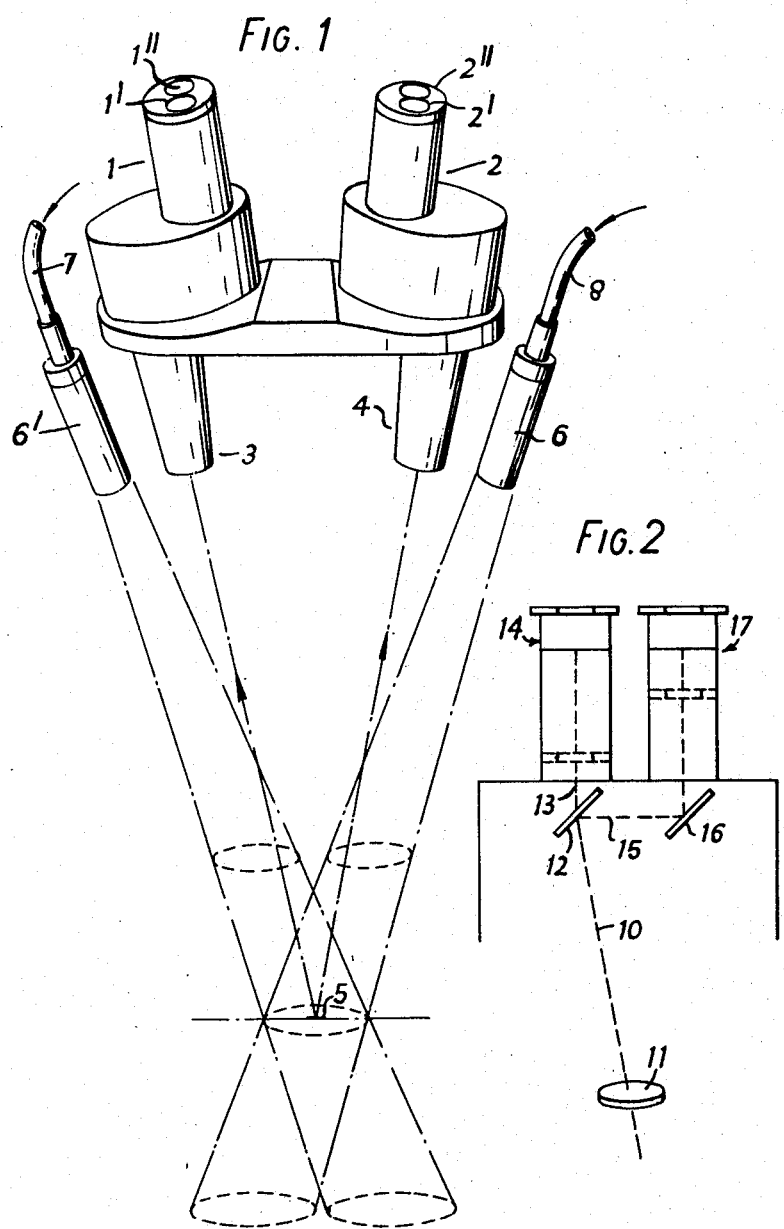

DUAL MAGNIFICATION MICROSCOPE

This is a continuation of application Ser. No. 182,687, filed Sept. 22, 1971, and now abandoned.

This invention relates to an instrument, specifically a microscope, for viewing an object through an optical system affording a choice among different magnification ratios.

During intricate and delicate surgical operations it is often necessary to have some form of optical magnification provided to enable a surgeon to see more clearly details of his work. Often during such operations it is necessary to change this magnification. In eye surgery, for example, two magnifications of, say, × 5 and × 10 are needed.

This requirement is now generally met by the use of zoom binocular microscopes, where the magnification is changed by means of a foot switch and an electric motor which causes the zooming mechanism to come into operation.

Where only a small number of discrete magnifications, for example two, are required, a zoom microscope is an unnecessarily expensive instrument. It also has the disadvantage of the inevitable time delay incurred in adjusting the microscope from one magnification to the other or others.

It is an object of the present invention to provide a microscope which is capable of simultaneously providing a plurality of discrete magnifications for otherwise identical images alternately viewable, by slight head or eye motion without the expense and inconvenience of a zoom mechanism.

This aim is realized, in accordance with my present invention, by providing a monocular microscope (or, in the case of a binocular instrument, each monocular half thereof) with a single objective trained upon an object to be viewed and with a pair of eyepieces respectively including a first and a second lens alternately viewable with the same eye of an observer; these two lenses need not be distinct optical elements but may be different parts of a common lens body of the bifocal type. The light from the object, after traversing the objective, is branched onto two separate ray paths whose respective degrees of magnification are determined by first and second optical means including the aforementioned eyepiece lenses. The optical means in these ray paths, while differing in magnification, present identically oriented images of the object to the observer's eye.

The branching of the light beam traversing the objective may be accomplished with the aid of a semireflective beam splitter directing a first and a second beam portion toward the corresponding eyepieces by way of the two ray paths, one with and the other without reflection. The desired difference in magnification may be realized by making the two ray paths of different geometrical length, e.g. with the path of the unreflected beam portion the longer the two.

The beam-splitting device may include a semireflecting film on the interface between two prisms serving to charge the orientation and/or handing of the image, i.e. to erect and/or laterally reverse same.

A lens for changing the effective length of an optical path may be interposed in the latter. This lens may be adjustable along its axis and is preferably a negative (e.g. biconcave) lens interposed in the longer of the optical paths. This enables eyepieces of the same focal length (e.g. of identical structure) to be used in the two optical paths of a bifocal system.

In many instances it is more convenient for the observer to view the object at an inclination to the normal to the object, and for this purpose a prism configuration may be provided such that the beams entering the eyepieces are inclined with respect to the beam entering the optical system from the object being viewed (and therefore to the objective axis).

The beam-splitting device may include a prism arranged in an optical path which is not reflected by the grating mirror and adjustable relative to the mirror so as to enable adjustment of the length of this non-reflected path, so as to facilitate modification of the parameters of that path for the purpose of providing a different magnification, e.g. by a changing an eyepiece for one of a different focal length.

Preferably the beam-splitting device is so designed that the image of the object is presented to the viewer along one optical path at substantially the same intensity of illumination as that presented to him along the other optical path, that intensity (neglecting losses) varying inversely as the square of the magnification. This is accomplished by providing a beam-splitting device in which (subject to appropriate allowance being made to compensate for losses) the ratio of reflected to transmitted light equals the square of the ratio of the magnifications of the two optical paths.

In a microscope embodying the invention, the magnification provided by one path is preferably not more than five times as great as that provided by the other one; the respective magnification may, for example, be ×5 and ×10.

Means for illuminating the object may include a light conduit, designed according to fiber-optics techniques, extending from a light source situated remote from the objective to a projector associated with the latter. Separate illuminating means may be respectively associated with the two optical paths and may be attached to the outside of the or each objective by their projectors.

These and other features of the invention will be be described in greater detail with reference to the accompanying diagrammatic drawing in which:

FIG. 1 is a perspective view of a binocular microscope according to my invention, complete with illuminating means;

FIG. 2 shows one form of optical system of a monocular microscope according to my invention and FIGS. 3 and 4 show other optical systems according to the invention which could be either the systems of a monocular microscope or one of a two identical systems of binocular microscope.

Figure 3:
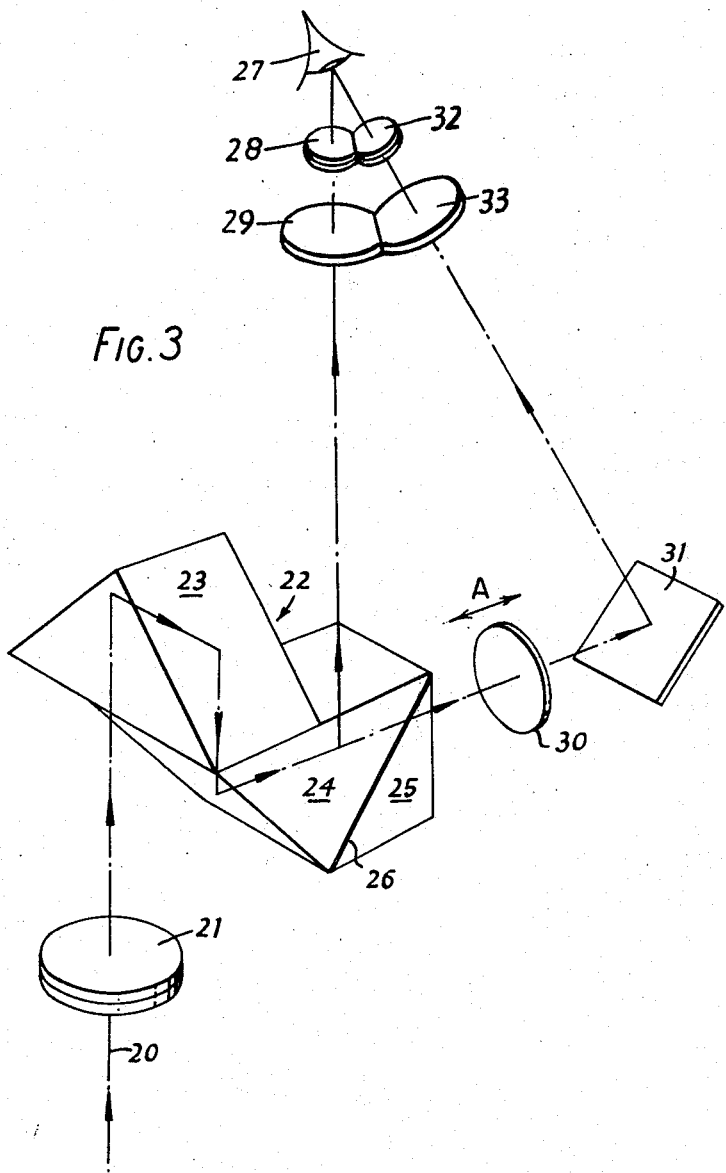

As shown in FIG. 1, a binocular microscope consists of two monocular halves each with an eyepiece unit 1, 2 and a single objective 3, 4, respectively. The eyepiece units 1, 2 each comprise two lenses 1', 1'' and 2' 2'', respectively. If desired, the two eyepiece lenses 1', 1'' (or 2', 2'') of each unit may be combined into a single bifocal lens. The focal lengths of the lenses 1' and 2' are the same; so are the focal lengths of the lenses 1'', 2''. However, the focal lengths of the lenses 1', 1'' (and therefore also those of the lenses 2', 2'') differ from each other.

Means (not shown in FIG. 1 but hereinafter described with reference to FIGS. 2 to 4) including deflecting prisms and beam-splitting devices are provided for each of the two monocular halves 1, 3 and 2, 4 of the instrument for creating optical paths between the objectives 3, 4 and their respective associated eyepiece lenses 1', 1'', 2', 2'' of lengths related to the respective focal lengths of the lenses 1', 2' and 1'', 2'', so that an object 5 viewed by a user is in focus, whether seen through the lenses 1', 2' or the lenses 1'', 2'', the viewer merely having to move his eye or head slightly from one pair of lenses to the other in order to see the object at two different magnifications.

The objectives 3, 4 each have associated therewith a respective projector 6, 6' which directs light supplied thereto through fiber-optical conduits 7, 8 from a remote light source (not shown).

The axes of the objectives 3, 4 and of the projectors 5, 6 converge on the object 5 being viewed.

FIG. 2 shows diagrammatically the optical system for a monocular microscope according to the invention, in which a beam of light 10 from the nonillustrated object can be seen traveling through the objective 11 to a beam splitter 12 whence one beam 13 enters a first eyepiece 14 and a second beam 15, produced by deflection by the beam splitter 12, impinges on a mirror 16 which deflects it into a second eyepiece 17. The eyepiece 14 has a focal length for giving a ×10 magnification, whereas the eyepiece 17 provides a ×5 magnification. It will be noted that the two juxtaposed eyepieces include lenses that are relatively axially offset in order to provide optical paths of lengths compensating for the different focal lengths of these eyepieces.

In the preferred form of optical system for a bifocal microscope shown in FIG. 3, a beam of light 20 from the object being viewed passes through an objective 21, and thence through a prism assembly 22 comprising a handing prism 23 (for correcting lateral reversal of the image of the object) and a beam splitter which consists of two prisms 24, 25 with a semi-reflecting film 26 therebetween. The prism 24 also acts as an erecting prism, so that the viewer does not see the object upside down. Part of the beam so split then passes to the viewer's eye 27 through a first eyepiece consisting of two lenses 28, 29. The other part of the split beam passes through a negative lens 30 to a mirror 31 where it is deflected into the viewer's eye 27 through a second eyepiece consisting of two lenses 32, 33. The negative lens 30, inserted in the longer of the two optical paths of the bifocal system, enables two identical eyepieces 28, 29 and 32, 33 to be used. This technique of producing a bifocal optical system, having different degrees of magnification, notwithstanding the use of two eyepieces of th same focal length is particularly suitable where the overall magnification is not high.

The change of magnification obtained by the use of this negative lens 30 is the ratio of the distance between the negative lens 30 and the image plane and the distance between the original image plane and the plane of insertion of the negative lens. A typical magnification change obtainable is of the order of 1.5 : 1, and exact image-plane correction can be obtained by small changes in the axial position of the negative lens 30, which accordingly is made adjustable in this respect as indicated by an arrow A.

Figure 4:
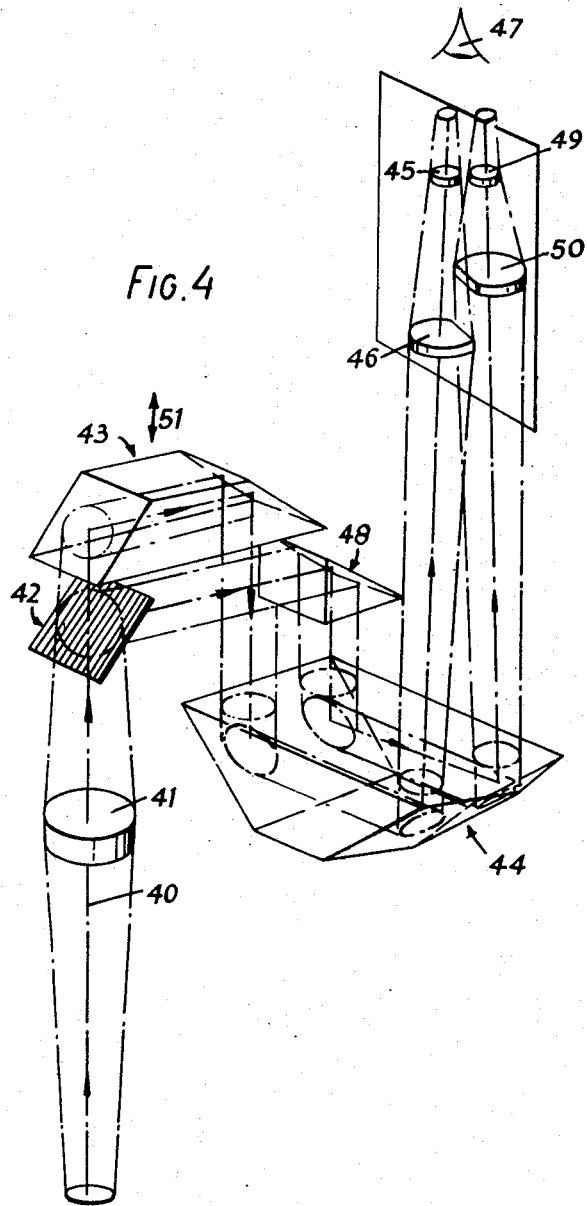

FIG. 4 shows a more complex form of optical system, also suitable fo a bifocal microscope, in which a handing and erecting prism assembly is designed to produce beam splitting and individual focusing of one of the two optical paths.

A beam of light 40 from the object being viewed passes through an objective 41 to a grating mirror 42 whose line configuration is such that it behaves substantially like a continuous semi-reflecting surface but is substantially free from distortion-producing diffraction effects. The mirror 42 is so designed that the image of the object is presented to the viewer at substantially the same intensity of illumination along both optical paths of the system, and to this end the ratio of the light reflected by the mirror 42 to that transmitted by it is (neglecting losses) equal to the square of the ratio of the magnifications provided by the light paths.

A component of the split beam, i.e. the part which is transmitted by the mirror 42, then passes through a first erecting prism 43, thence through a handing prism 44 and thereafter through a first eyepiece consisting of lenses 45, 46 to the viewer's eye 47.

The other part of the split beam i.e. the part which is reflected by the mirror 42, passes through a second erecting prism 48, thence also through the handing prism 44 and then through a second eyepiece consisting of lenses 49, 50 to the viewer'ss eye 47.

By making the position of the prism 43 adjustable along the direction of the arrow 51, the length of the optical path with which it is associated can be varied. This is a useful feature since it provides a convenient way of adjusting the length of the optical path concerned to suit a variety of eyepieces 45, 46 of different focal lengths, in cases where different magnification ratios may be required for different purposes, e.g. in certain manufacturing processes, such as watchmaking, where minute components have to be assembled and treated. Thus, microscopes embodying the invention may, at different times, find application in different process steps or in relation to components of different degrees of intricacy.

An instrument embodying the invention may, of course, be modified in many ways from the specific embodiments particularly described. For example, a single projector or light source could be provided for a binocular microscope in place of one projector for each monocular half thereof, as shown in FIG. 1. Moreover, microscopes embodying the invention may also, for convenience of viewing, be of the "angled" kind wherein the object is viewed at an inclination to the normal to the object. In the instrument shown in FIG. 3, a convenient way of achieving this is to vary the angle of the top surface of the prism 24 with the horizontal (for providing the requisite viewing angle in respect of one of the optical paths) and the angle at the hypotenuse of the prism 25 (for providing the requisite viewing angle in respect of the other path).

I claim:
1. An optical microscope comprising:
   an objective adapted to be trained upon an object to be viewed;
   a pair of eyepieces respectively including first lens means and second lens means with intersecting optical axes closely juxtaposed for alternate viewing with the same eye of an observer at the point of intersection of said optical axes;
   first optical means including said objective and said first lens means for establishing a first ray path for light from said object traversing said objective;
   second optical means including said objective and said second lens means for establishing a second ray path for light from said object traversing said objective, said first and second optical means having different degrees of magnification but presenting identically oriented images of said object to the observer's eye; and semireflective means optically in line with said objective for splitting a light beam from said object into a reflected first beam portion and an unreflected second beam portion respectively traveling over said first and second ray paths, said semireflective means being effective to distribute the light of said beam between said beam portions with an intensity ratio substantially equaling the ratio of the squares of the corresponding degrees of magnification.

2. The microscope defined in claim 1 wherein said first and second ray paths are of different geometrical lengths.

3. The microscope defined in claim 2 wherein one of said optical means is adjustable and provided with means for varying the relative lengths of said ray paths.

4. The microscope defined in claim 2 wherein one of said optical means includes supplemental lens means for compensating for the difference in the geometrical lengths of said light paths, said eyepieces having identical focal lengths.

5. The microscope defined in claim 4 wherein said supplemental lens means is disposed in the longer of said ray paths and is of negative power.

6. The microscope defined in claim 4 wherein said supplemental lens means is axially adjustable.

7. The microscope defined in claim 2 wherein said second ray path is longer than said first ray path.

8. The microscope defined in claim 2 wherein said semireflective means comprises a pair of contacting prisms provided with a semi-reflecting film on their contact surface.

9. The microscope defined in claim 8 wherein said pair of prisms form part of a prism assembly for modifying the orientations of the images presented through said eyepieces.

10. The microscope defined in claim 1, further comprising fiber-optical illumination means for said object terminating in the vicinity of said objective.

11. A binocular microscope instrument comprising a pair of monocular optical microscopes each as defined in claim 1.

12. The instrument defined in claim 11 wherein each of said monocular microscopes is provided with an individual light source disposed next to the objective thereof.

13. The instrument defined in claim 12 wherein said light source comprises a fiber-optical conduit terminating in the vicinity of said objective.

* * * * *